United States Patent
Im (10) Patent No.: US 12,499,612 B2
(45) Date of Patent: Dec. 16, 2025

(54) THREE-DIMENSIONAL SCANNER DEVICE FOR SELECTIVELY BINNING IMAGES OBTAINED BY THREE-DIMENSIONAL SCANNER, OPERATION METHOD, AND COMPUTER-READABLE STORAGE MEDIUM IN WHICH PROGRAM FOR EXECUTING SAME OPERATION METHOD IS STORED

(71) Applicant: MEDIT CORP., Seoul (KR)

(72) Inventor: Sung Bin Im, Seoul (KR)

(73) Assignee: MEDIT CORP., Seoul (KR)

( * ) Notice: Subject to any disclaimer, the term of this patent is extended or adjusted under 35 U.S.C. 154(b) by 170 days.

(21) Appl. No.: 18/019,961

(22) PCT Filed: Aug. 11, 2021

(86) PCT No.: PCT/KR2021/010653
§ 371 (c)(1),
(2) Date: Feb. 6, 2023

(87) PCT Pub. No.: WO2022/045650
PCT Pub. Date: Mar. 3, 2022

(65) Prior Publication Data
US 2023/0290045 A1    Sep. 14, 2023

(30) Foreign Application Priority Data

Aug. 24, 2020 (KR) .......................... 10-2020-0106358

(51) Int. Cl.
*G06T 15/20* (2011.01)
*G06T 7/00* (2017.01)
(Continued)

(52) U.S. Cl.
CPC .......... *G06T 15/205* (2013.01); *G06T 7/0012* (2013.01); *G06T 7/62* (2017.01);
(Continued)

(58) Field of Classification Search
None
See application file for complete search history.

(56) References Cited

U.S. PATENT DOCUMENTS 9,325,966 B2 *  4/2016  Tin .......................... G01N 21/49
9,706,967 B2      7/2017  Wang et al.
(Continued)

FOREIGN PATENT DOCUMENTS

KR    10-1205128 B1    11/2012
KR    10-1488074 B1     1/2015
(Continued)

OTHER PUBLICATIONS

Kayo Suzuki et al. "Index Image Generation Using DSP in High-Definition Still Image Retrieval", 2004, 47th Midwest Symposium on Circuits and Systems, III-503-506 (Year: 2004).*
(Continued)

*Primary Examiner* — Michael J Cobb
(74) *Attorney, Agent, or Firm* — Sughrue Mion, PLLC (57) ABSTRACT

Provided are a three-dimensional (3D) scanner device, an operating method, and a computer-readable storage medium having stored a program for performing the operating method. An embodiment of the present disclosure provides a 3D scanner device including: a scanner configured to obtain a plurality of index images for setting an area index for distinguishing each area of the object by scanning an object using at least one camera, and to obtain a plurality of phase shift images by scanning the object through a phase shift method; a communication interface configured to receive the plurality of index images and the plurality of phase shift images from the scanner; and a processor configured to generate a 3D image of the object by performing image processing on the plurality of received index images and the plurality of received phase shift images, wherein the scanner is further configured to bin a plurality of index
(Continued)

images obtained through a camera selected from the at least one camera among the plurality of index images.

10 Claims, 8 Drawing Sheets

(51) Int. Cl.
  *G06T 7/62* (2017.01)
  *H04N 23/90* (2023.01)
  *H04N 25/46* (2023.01)

(52) U.S. Cl.
  CPC ............... *G06T 7/97* (2017.01); *H04N 23/90* (2023.01); *H04N 25/46* (2023.01); *G06T 2207/30036* (2013.01)

(56) References Cited

U.S. PATENT DOCUMENTS

| | | | |
|---|---|---|---|
| 11,497,402 | B2 | 11/2022 | Fan et al. |
| 2008/0099686 | A1 | 5/2008 | Defrise et al. |
| 2009/0124900 | A1 | 5/2009 | Vandenberghe |
| 2014/0218567 | A1 | 8/2014 | Han |
| 2017/0103569 | A1* | 4/2017 | Wu ............... G06T 15/04 |
| 2019/0379812 | A1 | 12/2019 | Suman et al. |

FOREIGN PATENT DOCUMENTS

| | | |
|---|---|---|
| KR | 10-2017-0032644 A | 3/2017 |
| KR | 10-2017-0111848 A | 10/2017 |
| KR | 10-2018-0126500 A | 11/2018 |
| KR | 10-2019-0139788 A | 12/2019 |
| WO | 2018/116305 A1 | 6/2018 |

OTHER PUBLICATIONS

Jason Geng, "Structured-Light 3D Surface Imaging: A Tutorial", 2011, Advances in Optics and Photonics, 3:128-160 (Year: 2011).*
International Search Report for PCT/KR2021/010653 dated Nov. 26, 2021 [PCT/ISA/210].
Written Decision on Registration for KR 10-2020-0106358 dated Sep. 7, 2022.

* cited by examiner

THREE-DIMENSIONAL SCANNER DEVICE FOR SELECTIVELY BINNING IMAGES OBTAINED BY THREE-DIMENSIONAL SCANNER, OPERATION METHOD, AND COMPUTER-READABLE STORAGE MEDIUM IN WHICH PROGRAM FOR EXECUTING SAME OPERATION METHOD IS STORED

TECHNICAL FIELD

The present disclosure relates to a three-dimensional (3D) scanner device and an operating method thereof, and more particularly, to a method and apparatus for transmitting a plurality of images obtained through a scanner to a processing device.

BACKGROUND ART

Dental computer aided design/computer aided manufacturing (CAD/CAM) technology is widely used for dental treatment, and particularly, for prosthetic treatment. The most important thing in dental treatment using CAD/CAM is to obtain precise three-dimensional (3D) data regarding a shape of an object, such as a patient's teeth, gums, and jawbone. When dental treatment is performed by using 3D image data obtained from an object, there is an advantage in that accurate calculation is performed by a computer.

Optical 3D scanners are widely used in the dental CAD/CAM field. An optical 3D scanner may obtain a plurality of two-dimensional images by using light reflected from an object and process the two-dimensional images to obtain 3D surface shape information of the object. The optical 3D scanner obtains a plurality of two-dimensional images by scanning an object using a plurality of cameras, and transmits the obtained two-dimensional images to a processing device.

Recently, each of two-dimensional images obtained through an optical 3D scanner has been high in resolution enough to include, for example, 5 million pixels. In some cases, each high-resolution image file may have a capacity of about 5 M bytes. In this case, there is a problem in that it takes a lot of time to transmit two-dimensional images obtained through an optical 3D scanner to a processing device. In order to solve the above problem, a method of compressing a plurality of two-dimensional images by binning may be taken into account. However, there is a disadvantage in that the quality of images is deteriorated because the resolution is lowered during compression.

DISCLOSURE

Technical Problem

The present disclosure aims to a three-dimensional (3D) scanner device and a method capable of improving the transmission speed of a plurality of images to a processing device, without degrading the quality of images, by selectively binning a plurality of image files obtained through a 3D scanner.

Technical Solution

To solve the technical problem described above, an embodiment of the present disclosure provides a method of processing an image obtained by a three-dimensional (3D) scanner. The method may include: obtaining a plurality of index images for setting an area index for distinguishing each area of the object by scanning an object using a plurality of cameras; obtaining a plurality of phase shift images through a phase shift method by scanning the object using the plurality of cameras; binning a plurality of index images obtained through at least one camera selected from the plurality of cameras from among the plurality of index images; and transmitting the plurality of index images and the plurality of phase shift images to a processing device connected to the 3D scanner.

In addition, in an embodiment of the present disclosure, the plurality of index images may include a plurality of first index images obtained by using a first camera and a plurality of second index images obtained by using a second camera, and the binning of the plurality of index images may include binning a plurality of index images obtained by using at least one camera selected from the first camera and the second camera among the plurality of first index images and the plurality of second index images.

In addition, in an embodiment of the present disclosure, the method may further include obtaining a plurality of phase shift images through a phase shift method by scanning the object using the at least one camera.

In addition, in an embodiment of the present disclosure, the plurality of phase shift images may include a plurality of first phase shift images obtained by using a first camera and a plurality of second phase shift images obtained by using a second camera, and the method may further include binning a plurality of phase shift images obtained by using at least one camera selected from the first camera and the second camera among the plurality of first phase shift images and the plurality of second phase shift images.

In addition, in an embodiment of the present disclosure, the binning of the plurality of phase shift images may include binning at least one phase shift image selected from the plurality of phase shift images obtained by using the selected at least one camera.

To solve the technical problem described above, an embodiment of the present disclosure provides a 3D scanner device for obtaining a 3D image of an object. A 3D scanner device may include: a scanner configured to obtain a plurality of index images for setting an area index for distinguishing each area of the object by scanning an object using a plurality of cameras, and to obtain a plurality of phase shift images by scanning the object through a phase shift method; a communication interface configured to receive the plurality of index images and the plurality of phase shift images from the scanner; and a processor configured to generate a 3D image of the object through image processing of combining the plurality of received index images and the plurality of received phase shift images, wherein the scanner is further configured to bin a plurality of index images obtained through at least one camera selected from the plurality of cameras among the plurality of index images.

In addition, in an embodiment of the present disclosure, the plurality of index images may include a plurality of first index images obtained by using a first camera and a plurality of second phase shift images obtained by using a second camera, and the scanner may be further configured to bin a plurality of index images obtained by using at least one camera selected from the first camera and the second camera among the plurality of first index images and the plurality of second index images.

In addition, in an embodiment of the present disclosure, the scanner may be further configured to: obtain a plurality of first phase shift images by using a first camera and obtain a plurality of second phase shift images by using a second camera; and bin a plurality of phase shift images obtained by using at least one camera selected from the first camera and the second camera among the plurality of first phase shift images and the plurality of second phase shift images.

In addition, in an embodiment of the present disclosure, the scanner may be further configured to bin at least one phase shift image selected from the plurality of phase shift images obtained by using the selected at least one camera.

To solve the technical problem described above, another embodiment of the present disclosure may provide a computer-readable recording medium having recorded thereon a program including at least one instruction for causing a computer to perform a method of processing an image obtained by a 3D scanner. The method of processing an image may include: obtain a plurality of index images for setting an area index for distinguishing each area of the object by scanning an object by using at least one camera; binning at least one of a plurality of index images obtained through a camera selected from the at least one camera from among the plurality of index images; and transmitting the plurality of index images to a processing device connected to the 3D scanner.

Advantageous Effects

A three-dimensional (3D) scanner device and an operating method thereof, according to the disclosed embodiments, may improve the transmission speed of a plurality of images obtained through a scanner to a processing device, without degrading the quality of generated 3D images.

DESCRIPTION OF DRAWINGS

The present disclosure may be easily understood in combination with the following detailed description and accompanying drawings, and reference numerals denote structural elements.

MODE FOR INVENTION

As for the terms as used in embodiments of the present disclosure, common terms that are currently widely used are selected as much as possible while taking into account the functions of the present disclosure. However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of embodiments of the present disclosure. Therefore, the terms as used in the present specification should be defined based on the meaning of the terms and the description throughout the present disclosure rather than simply the names of the terms.

The singular forms "a," "an," and "the" as used herein are intended to include the plural forms as well unless the context clearly indicates otherwise. All terms including technical or scientific terms as used herein have the same meaning as commonly understood by those of ordinary skill in the art.

Throughout the present disclosure, the expression "a portion includes a certain element" means that a portion further includes other elements rather than excludes other elements unless otherwise stated. Also, the terms such as " . . . er/or" and "module" described in the specification mean units that process at least one function or operation, and may be implemented as hardware, software, or a combination of hardware and software.

The expression "configured to" as used in the present disclosure may be used interchangeably with, for example, "suitable for," "having the capacity to," "designed to," "adapted to" "made to," or "capable of" depending on a situation. The term "configured to" may not necessarily mean only "specifically designed to" in hardware. Instead, in some situations, the expression "a system configured to" mean that the system is "capable of . . . " with other devices or components. For example, "a processor configured to perform A, B, and C" may refer to a dedicated processor (e.g., an embedded processor) for performing corresponding operations or a generic-purpose processor (e.g., a central processing unit (CPU) or an application processor) capable of performing corresponding operations by executing one or more software programs stored in a memory.

In the present disclosure, an 'object' is a subject to be scanned, and may include a human, an animal, or a part thereof. For example, the object may include a body part (organ, etc.), an artificial structure attachable to the object or insertable into the object, or a phantom. Hereinafter, the case of obtaining three-dimensional (3D) image data of an oral cavity including at least one tooth as an object will be described as an example. For example, the object may include teeth, gingiva, at least a portion of an oral cavity, and/or an artificial structure insertable into the oral cavity (for example, orthodontic appliances including brackets and wires, implants, artificial teeth, dental restorations including inlays and onlays, orthodontic aids inserted into the oral cavity, etc.). However, the present disclosure is not limited to the case of obtaining 3D image data of the oral cavity, and may be applied to obtain 3D image data of various objects.

In addition, in the present disclosure, 'data' may refer to information required to represent an object two-dimensionally or three-dimensionally, for example, raw data obtained by using at least one camera. Specifically, the raw data may be a two-dimensional image obtained so as to generate 3D image data of an object. The raw data may refer to two-dimensional images of different viewpoints obtained by a plurality of cameras when an object is scanned by using a 3D scanner (e.g., an intraoral scanner).

Hereinafter, embodiments will be described in detail with reference to the drawings.

Figure 1:
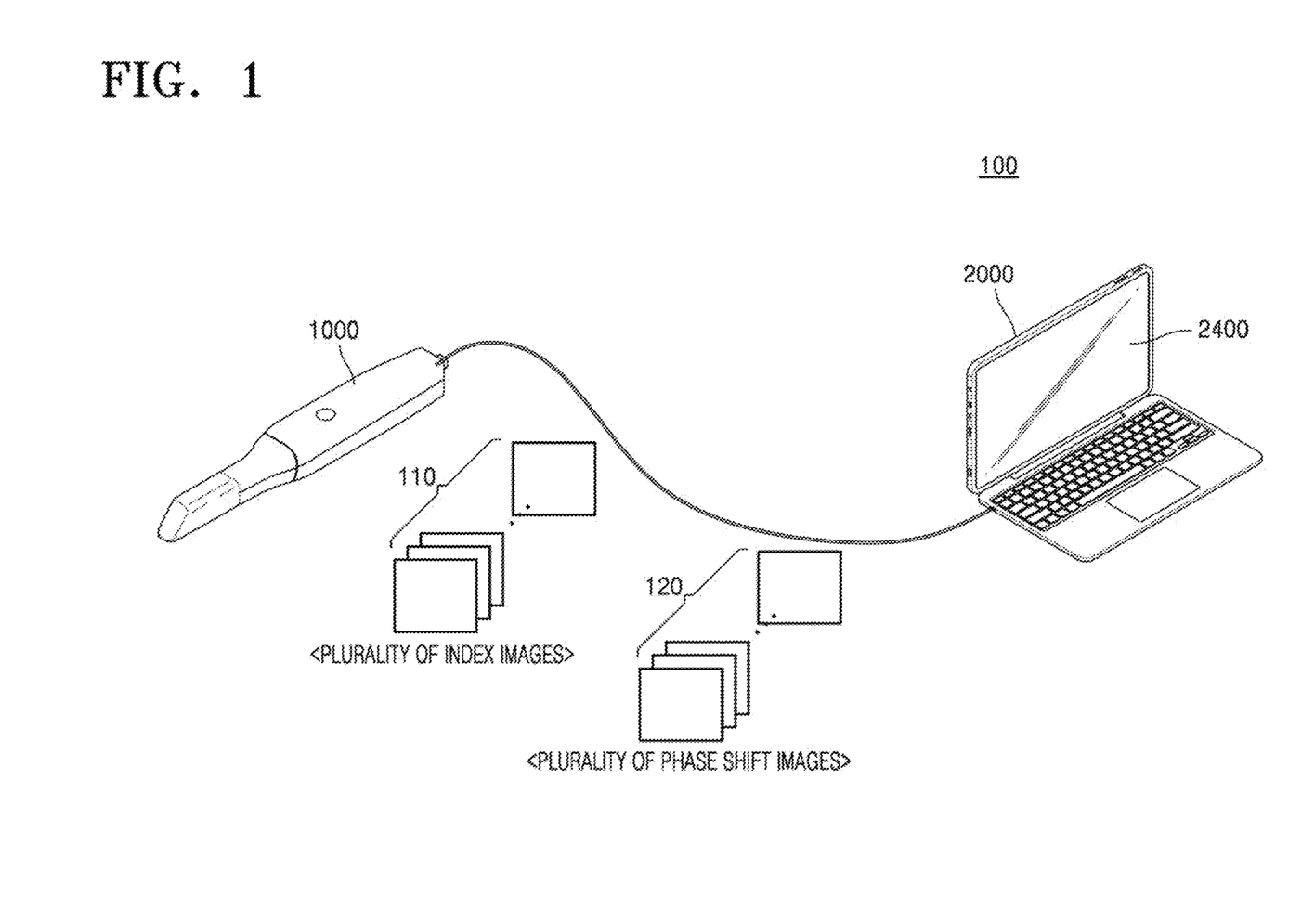
FIG. 1 is a conceptual diagram for schematically describing an operating method of a three-dimensional (3D) scanner device, according to an embodiment of the present disclosure.

FIG. 1 is a conceptual diagram for schematically describing an operating method of a 3D scanner device 100, according to an embodiment of the present disclosure.

As illustrated in FIG. 1, the 3D scanner device 100 according to an embodiment of the present disclosure may include a 3D scanner 1000 and a processing device 2000. Referring to FIG. 1, the 3D scanner 1000 may be configured as a table scanner that obtains 3D data of an object 10 by scanning the object 10 placed on a turn table using at least one camera 1100 or 1200.

However, the present disclosure is not limited thereto, and the 3D scanner 1000 may be configured as a handheld scanner. When the 3D scanner 1000 is configured as a handheld scanner, the 3D scanner 1000 may be a device that is inserted into the oral cavity to scan teeth in a non-contact manner and generate a 3D model of the oral cavity including at least one tooth. In addition, the 3D scanner 1000 may have a shape capable of being inserted into and taken out from the oral cavity, and may scan a patient's oral cavity by using at least one image sensor (e.g., an optical camera, etc.). Only essential elements for describing operations of the 3D scanner device 100 are illustrated in FIG. 1. The configurations included in the 3D scanner device 100 are not limited to those illustrated in FIG. 1.

In an embodiment, the 3D scanner device 100 may project pattern light onto the object 10 by using the 3D scanner 1000 and scan the object 10, onto which the pattern light is projected, to obtain 3D data representing the shape of the object 10 by using the principle of triangulation according to deformation of pattern.

The 3D scanner 1000 may obtain raw data by scanning the object 10. In an embodiment, the 3D scanner 1000 may include a medical device for obtaining an intraoral image. In an embodiment, the raw data obtained through the 3D scanner 1000 may include a plurality of index images 110 and a plurality of phase shift images 120. The index images 110 are images for setting an area index for distinguishing each area of the object 10. The phase shift images 120 are images for measuring a depth value of the surface of the object 10 by scanning the pattern light projected onto the object 10 in a phase shift manner. The index images 110 and the phase shift images 120 will be described in detail with reference to FIG. 3.

The 3D scanner 1000 and the processing device 2000 may be connected to each other by using a wired or wireless communication scheme. In an embodiment, the 3D scanner 1000 may be electrically and/or physically connected to the processing device 2000 by using one of communication schemes including a wired local area network (LAN), Ethernet, or Gigabit Ethernet (GigE). However, the present disclosure is not limited thereto, and the 3D scanner 1000 may be connected to the processing device 2000 by using a universal serial bus (USB) connection scheme of a USB 2.0 or USB 3.0 standard.

The 3D scanner 1000 may transmit the obtained index images 110 and phase shift images 120 to the processing device 2000.

The processing device 2000 may generate 3D image data three-dimensionally representing the shape of the surface of the object 10, based on the received raw data. The 3D image data may be point cloud data or polygon mesh data. In an embodiment, the processing device 2000 may obtain 3D image data by performing a 3D operation, such as an operation of combining the index images and the phase shift images, and may display, on a display 2400, a 3D image obtained by rendering the 3D image data. A detailed method by which the processing device 2000 obtains the 3D image data by using the index images and the phase shift images will be described in detail with reference to FIGS. 2 and 3.

The processing device 2000 may be any electronic device capable of generating, processing, displaying, and/or transmitting the 3D image data or 3D images of the object 10, based on the received raw data. For example, the processing device 2000 may be a computing device, such as a smartphone, a laptop computer, a desktop computer, a personal digital assistant (PDA), and a tablet personal computer (PC), but is not limited thereto. The processing device 2000 according to an embodiment may analyze 3D image data or 3D images of the object 10, and may process, display, and/or transmit an analysis result.

In addition, in an embodiment, the processing device 2000 may store and execute dedicated software operating in conjunction with the 3D scanner 1000. The dedicated software may be referred to as a dedicated program or dedicated application. When the processing device 2000 operates in conjunction with the 3D scanner 1000, the dedicated software stored in the processing device 2000 may be connected to the 3D scanner 1000 and receive data obtained through the scanning of the object 10 in real time. For example, there is dedicated software for processing data obtained through intraoral scanning in an i500 product that is an intraoral scanner available from Medit Corp. The processing device 2000 may store and execute the dedicated software corresponding to the i500 product. The transmission software may perform one or more operations to obtain, process, store, and/or transmit intraoral images.

The dedicated software may be stored in a processor (see 2200 of FIG. 5) or a memory (see 2300 of FIG. 5) of the processing device 2000. In addition, the dedicated software may provide a user interface for the use of the data obtained from the 3D scanner 1000. A user interface screen provided by the dedicated software may include the 3D image of the object 10 generated according to the disclosed embodiment.

Figure 2:
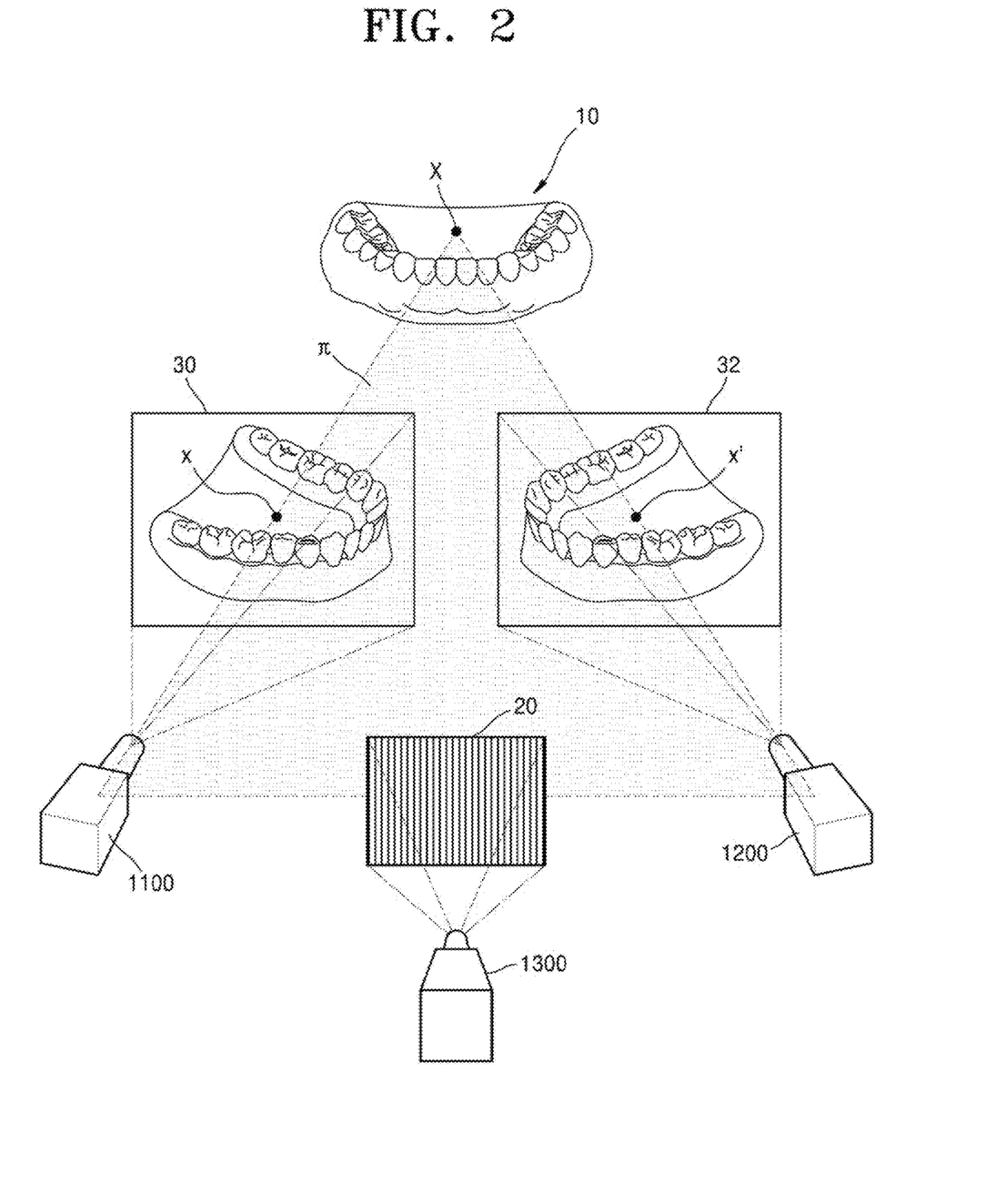
FIG. 2 is a diagram for describing a method by which a 3D scanner device obtains surface data of an object, according to an embodiment of the present disclosure.

FIG. 2 is a diagram for describing a method by which an optical 3D scanner obtains surface data, according to an embodiment.

In order to obtain 3D image data regarding the surface of the object by using the 3D scanner 1000 according to an embodiment, a 'structured light with stereo vision' method may be used.

The 3D scanner 1000 according to an embodiment may include two or more cameras 1100 and 1200 and at least one pattern light projector 1300 capable of projecting structured light (or pattern light) 20. For example, the pattern light projector 1300 may include at least one of a digital light processing (DLP) projector, a liquid crystal display (LCD) projector, and a laser projector. The 3D scanner 1000 according to an embodiment may project the structured light 20 onto the object 10 and obtain an L image 30 corresponding to a left field of view and an R image 32 corresponding to a right field of view, respectively, from the first camera 1100 corresponding to the left field of view and the second camera 1200 corresponding to the right field of view. The 3D scanner 1000 may sequentially obtain a two-dimensional image frame including the L image 30 and the R image 32 of the object 10. The 3D scanner 1000 or the processing device 2000 may reconstruct a 3D image frame representing the surface shape of the object from the two-dimensional image frame including the L image 30 and the R image 32.

The 3D scanner 1000 may obtain a plurality of two-dimensional frames by sequentially scanning the object. The 3D scanner 1000 or the processing device 2000 may obtain a plurality of 3D image frames from the two-dimensional image frames.

The processing device 2000 may reconstruct 3D image data of the entire object by merging or aligning the 3D image frames. In an embodiment, the processing device 2000 may identify, from the R image 32, a pixel point (x) on the L image 30 and a pixel point x' matched therewith, the L image 30 being obtained by scanning a specific point X of the object 10 by using the epipolar constraint. The epipolar constraint is a principle in which the pixel points x and x' corresponding to each other are arranged on an epipolar line formed when an epipolar plane π formed by the first camera 1100, the second camera 1200, and the specific point X of the object intersects with an image plane. In an embodiment, the processing device 2000 may use the principle to identify the pixel point x' of the R image 32 corresponding to the specific pixel point x of the L image 30, and may obtain 3D point information about the pixel points x and x' by performing optical triangulation, based on position information of the identified pixel points x and x'. The processing device 2000 may generate 3D image data of the object by performing the above-described operation on all pixel points included in the L image 30 and the R image 32.

Figure 3:
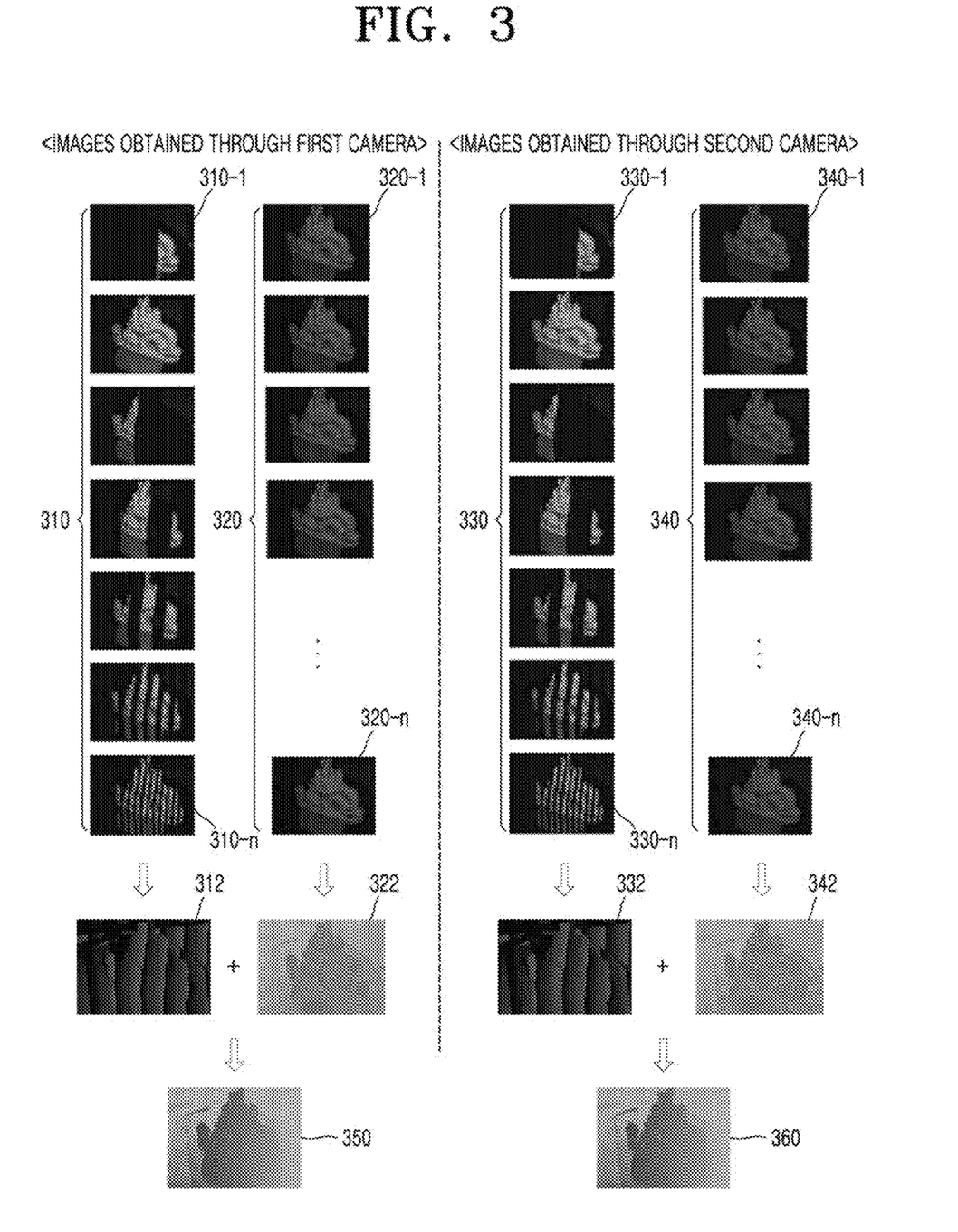
FIG. 3 is a diagram illustrating a plurality of images obtained by a 3D scanner device, according to an embodiment of the present disclosure.

FIG. 3 is a diagram illustrating a plurality of images obtained by the 3D scanner device 100, according to an embodiment of the present disclosure.

Referring to FIG. 3, the first camera (see 1100 of FIG. 2) corresponding to the left field of view among the cameras 1100 and 1200 may obtain a plurality of first index images 310 and a plurality of first phase shift images 320. The second camera (see 1200 of FIG. 2) corresponding to the right field of view among the cameras 1100 and 1200 may obtain a plurality of second index images 330 and a plurality of second phase shift images 340.

The pattern light projector (see 1300 of FIG. 2) may project a plurality of gray code patterns onto the object 10 in order to distinguish the area of the object 10 into at least one preset area. In an embodiment, the gray code patterns may each be a binary code pattern that divides an area to have a binary index value including 0 and 1.

The first camera 1100 may obtain the first index images 310 by scanning the object 10 onto which the gray code patterns are projected. The first index images 310 may include first-first to first-$n^{th}$ index images 310-1 to 310-$n$.

Similarly, the second camera 1200 may obtain the second index images 330 by scanning the object 10 onto which the gray code patterns are projected. Like the first index images 310, the second index images 330 may include index images 330-1 to 330-$n$, but is not limited thereto.

The pattern light projector 1300 may project a plurality of phase shift patterns having different phase values from each other by shifting a phase on the surface of the object 10. In an embodiment, the pattern light projector 1300 may project a plurality of phase shift patterns onto the object 10.

The first camera 1100 may obtain the first phase shift images 320 by scanning the object 10 onto which the phase shift patterns are projected. The first phase shift images 320 may include first-first to first-$n^{th}$ phase shift images 320-1 to 320-$n$.

Similarly, the second camera 1200 may obtain the second phase shift images 340 by scanning the object 10 onto which the phase shift patterns are projected.

The first camera 1100 and the second camera 1200 may transmit, to the processing device (see 2000 of FIG. 1), the obtained first index images 310, the obtained first phase shift images 320, the obtained second index images 330, and the obtained second phase shift images 340. The processing device 2000 may obtain 3D data of the object by using the first index images 310, the first phase shift images 320, the second index images 330, and the second phase shift images 340, which are received from the first camera 1100 and the second camera 1200.

Specifically, the processing device 2000 may generate a first index map 312 by combining the first index images 310, and may generate a first phase angle map 322 by combining the first phase shift images 320. The processing device 2000 may generate a first unwrapped phase angle map 350 by combining the first index map 312 and the first phase angle map 322. The 'unwrapped phase angle map' refers to a map having different phase shift values according to a pixel. Similarly, the processing device 2000 may generate a second index map 332 by combining the second index images 330, and may generate a second phase angle map 342 by combining the second phase shift images 340. The processing device 2000 may generate a second unwrapped phase angle map 360 by combining the second index map 332 and the second phase angle map 342.

The processing device 2000 may perform pixel matching between the first unwrapped phase angle map 350 and the second unwrapped phase angle map 360 by using the epipolar constraint. In an embodiment, the processing device 2000 may identify a pixel point corresponding to a specific pixel point, which is included in the first unwrapped phase angle map 350, on the second unwrapped phase angle map 360. The processing device 2000 may obtain 3D data of the object by performing optical triangulation, based on position information of the identified pixel point. The processing device 2000 may generate a final 3D image of the object 10 by rendering the obtained 3D data.

The 3D scanner (see 1000 of FIG. 1) including the first camera 1100 and the second camera 1200 may be connected to the processing device 2000 through a communication interface. For example, the 3D scanner 1000 may be electrically and/or physically connected to the processing device 2000 by using one of communication schemes including a wired LAN, Ethernet, or GigE. In the case of Giga Ethernet, data may be transmitted and received at a transmission rate of 70 Mbps.

When the capacity of image data is large, it takes a lot of time to transmit the image from the 3D scanner 1000 to the processing device 2000. Therefore, in order to reduce the transmission time, a method of binning image data may be taken into account. The index image among the index image and the phase shift image is not for measuring an actual pixel value (e.g., a depth value) of the surface of the object 10 but for distinguishing the areas of the object 10. Therefore, the index image may be binned.

In this case, instead of binning all the index images 310 and 330, only the first index images 310 or only the second index images may be binned. In addition, both the first index images 310 and the second index images 330 may be binned. In addition, the capacity of image data may be reduced by binning a plurality of phase shift images selected among the first phase shift images 320 and the second phase shift images 340 obtained by using the cameras 1100 and 1200. This will be described in detail with reference to FIG. 4.

Figure 4:
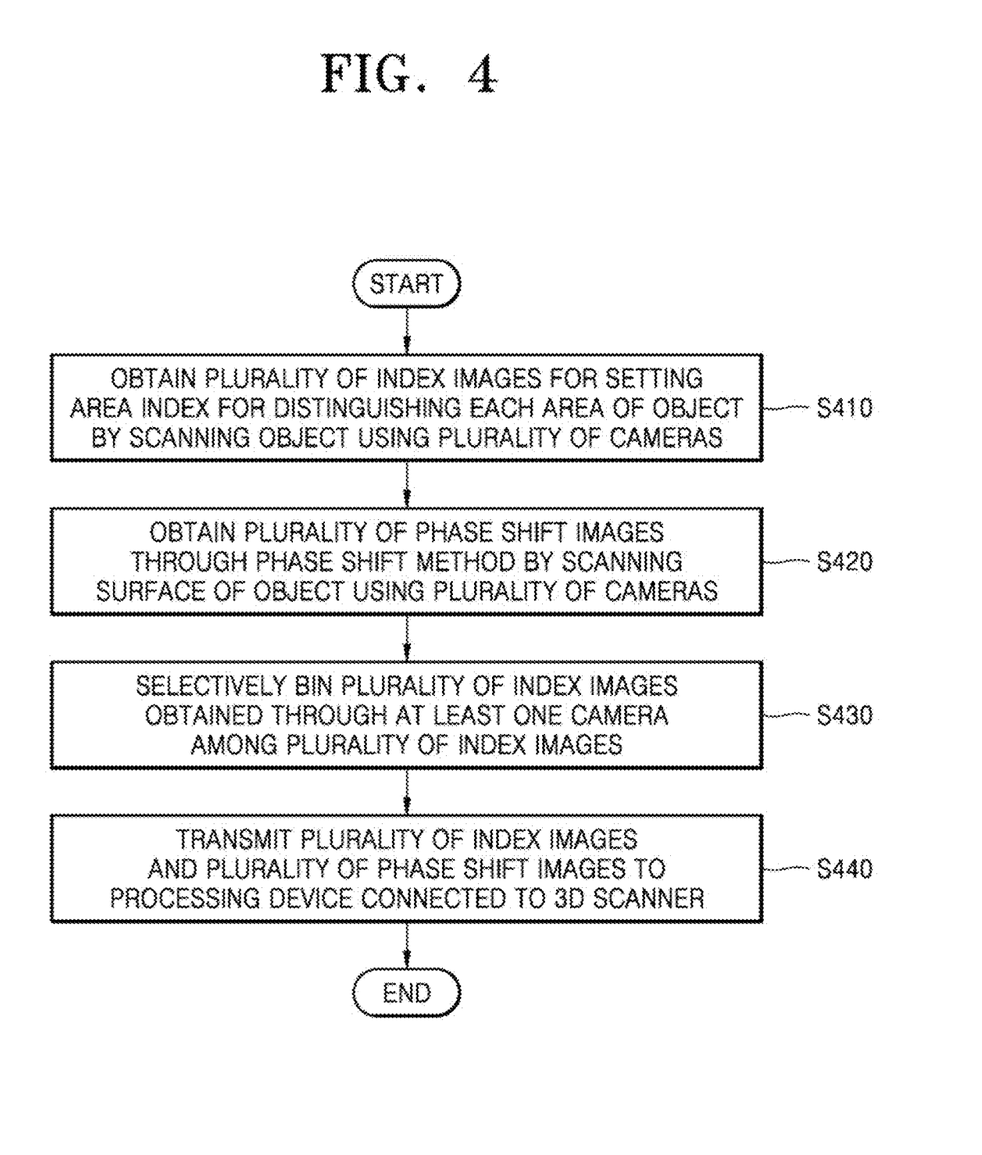
FIG. 4 is a flowchart of an operating method of a scanner, according to an embodiment of the present disclosure.

FIG. 4 is a flowchart of an operating method of the 3D scanner 1000, according to an embodiment of the present disclosure.

In operation S410, the 3D scanner 1000 obtains a plurality of index images for setting an area index for distinguishing each area of an object by scanning the object using a plurality of cameras. Referring to FIG. 3 together, the 3D scanner 1000 may project a plurality of gray code patterns onto the object 10 by using the pattern light projector (see 1300 of FIG. 2), and may obtain a plurality of first index images (see 310 of FIG. 3) by using the first camera 1100. The 3D scanner 1000 may obtain a plurality of second index images (see 330 of FIG. 3) by using the second camera 1200. Because a detailed method of obtaining the first index images 310 and the second index images 330 is the same as described with reference to FIG. 3, redundant descriptions thereof are omitted.

In operation S420, the 3D scanner 1000 obtains a plurality of phase shift images through a phase shift method by scanning the surface of the object using the cameras. In an embodiment, the 3D scanner 1000 may project a plurality of phase shift patterns having different phase values onto the surface of the object 10 by using the pattern light projector 1300, and may scan the surface of the object 10 by using the first camera 1100 to obtain a plurality of first phase shift images (see 320 of FIG. 3). The 3D scanner 1000 may obtain a plurality of second phase shift images (see 340 of FIG. 3) by using the second camera 1200. Because a detailed method of obtaining the first phase shift images 320 and the second phase shift images 340 is the same as described with reference to FIG. 3, redundant descriptions thereof are omitted.

In operation S430, the 3D scanner 1000 bins a plurality of index images at a predetermined compression rate. In an embodiment, the 3D scanner 1000 may bin a plurality of index images selected from the first index images 310 and the second index images 330. In an embodiment, the 3D scanner 1000 may generate a binned index image by sampling a plurality of pixels included in the first index images 310 or the second index images 330 at a predetermined compression rate. For example, when 2×2 pixels adjacent to each other in horizontal and vertical direction are binned into one pixel, the 3D scanner 1000 may obtain a binned index image having only 25% of pixels of an original index image. For example, when binning is performed to compress an original index image having a total of 5 million pixels to 25%, the 3D scanner 1000 may obtain a binned index image having about 1.25 million pixels.

As another example, when 3×3 pixels adjacent to each other in horizontal and vertical directions are binned into one pixel, the 3D scanner 1000 may obtain a binned index image having only 11% of pixels of an original index image. Similarly, when binning is performed to compress an original index image having a total of 5 million pixels to 11%, the 3D scanner 1000 may obtain a binned index image having about 550,000 pixels.

In an embodiment, the 3D scanner 1000 may generate a binned index image by calculating an average of pixel values, which are signal values of a plurality of pixels adjacent to each other in the original index image, and replacing the pixel values of the pixels with the calculated average. In another embodiment, the 3D scanner 1000 may generate a binned index image by sampling one of the pixel values of the pixels adjacent to each other in the original index image and compressing the pixels into one pixel having the sampled pixel value. However, the present disclosure is not limited thereto, and the 3D scanner 1000 may bin the original index image by using any known binning methods.

In an embodiment, the 3D scanner 1000 may bin only the first index images obtained through the first camera 1100 among the first index images 310 and the second index images 330, or may bin only the second index images obtained through the second camera 1200 among the first index images 310 and the second index images 330. In another embodiment, the 3D scanner 1000 may bin both the first index images 310 and the second index images 330. In another embodiment, the 3D scanner 1000 may transmit the first index images 310 and the second index images 330 to the processing device 2000 in an original state without binning.

However, the 3D scanner 1000 does not bin only the index images. In an embodiment, the 3D scanner 1000 may bin the phase shift images. In an embodiment, the 3D scanner 1000 may bin only phase shift images selected from the first phase shift images 320 and the second phase shift images 340. For example, the 3D scanner 1000 may bin only the second phase shift images 340 obtained through the second camera 1200, and may maintain the first phase shift images 320 in a non-binned original state. However, the present disclosure is not limited thereto. In an embodiment, the 3D scanner 1000 may bin only the first phase shift images 320 obtained through the first camera 1100. In another embodiment, the 3D scanner 1000 may transmit all of the first phase shift images 320 and the second phase shift images 340 to the processing device 2000 in an original state without binning.

In operation S440, the 3D scanner 1000 transmits the binned index images and the phase shift images to the processing device 2000 connected to the 3D scanner 1000. The 3D scanner 1000 may be electrically and/or physically connected to the processing device 2000 by using one of communication schemes including, for example, a wired LAN, Ethernet, or GigE. For example, in a case where the number of first index images and the number of second index images are each n and the number of first phase shift images and the number of second phase shift images are each k, when it is assumed that the time required to transmit one image file to the processing device 2000 is unit time 1 (for example, when connected via GigE), the time required to transmit the index images and the phase shift images in an original state is shown in Table 1 below.

TABLE 1

| | State | Number | Transmission time (unit time) |
|---|---|---|---|
| First index image | Original | n | n |
| Second index image | Original | n | n |
| First phase shift image | Original | k | k |
| Second phase shift image | Original | k | k |
| Total | | 2n + 2k | 2n + 2k |

When the 3D scanner 1000 performs binning to compress the first index images and the second index images to 25%, that is, when 2×2 pixels are binned into one pixel, the transmission time of image data is shown in Table 2 below.

TABLE 2

| | State | Number | Transmission time (unit time) |
|---|---|---|---|
| First index image | 25% binning | n | n/4 |
| Second index image | 25% binning | n | n/4 |
| First phase shift image | Original | k | k |
| Second phase shift image | Original | k | k |
| Total | | 2n + 2k | n/2 + 2k |

In Table 2, when the first index images and the second index images are binned to 25%, that is, when the first index images and the second index images are binned to ½, the transmission time taken is (n/2+2k) unit time.

When the 3D scanner 1000 performs binning to compress the first index images and a the second index images to 11%, that is, when 3×3 pixels are binned into one pixel, the transmission time of image data is shown in Table 3 below.

TABLE 3

|  | State | Number | Transmission time (unit time) |
| --- | --- | --- | --- |
| First index image | 11% binning | n | n/9 |
| Second index image | 11% binning | n | n/9 |
| First phase shift image | Original | k | k |
| Second phase shift image | Original | k | k |
| Total |  | 2n + 2k | 2n/9 + 2k |

In Table 3, when the first index images and the second index images are binned to 11%, that is, when the first index images and the second index images are binned to ⅓, the transmission time taken is (2n/9+2k) unit time.

When the 3D scanner 1000 selectively bins not only the index images but also the phase shift images, the transmission time of image data may be further shortened. For example, when the 3D scanner 1000 bins the first index images and the second index images to 25%, bins the second phase shift images to 25%, and maintains the first phase shift images as originals, the transmission time of image data is shown in Table 4 below.

TABLE 4

|  | State | Number | Transmission time (unit time) |
| --- | --- | --- | --- |
| First index image | 25% binning | n | n/4 |
| Second index image | 25% binning | n | n/4 |
| First phase shift image | Original | k | k |
| Second phase shift image | 25% binning | k | k/4 |
| Total |  | 2n + 2k | n/2 + 5k/4 |

In Table 4, when the first index images and the second index images are binned to 25% and the second phase shift images are binned to 25%, the transmission time taken is (n/2+5k/4) unit time. The index images among the image data obtained by the 3D scanner 1000 are not images for measuring the actual pixel value (e.g., the depth value) of the surface of the object, but images for setting only the indices of the areas of the object. Therefore, when the binning is performed, the quality of the final 3D image is not affected. However, the phase shift images are images for obtaining the actual pixel value. Therefore, when the phase shift images are selectively binned, the quality of the obtained final 3D image may be affected. However, in the case of the binning performed by the 3D scanner 1000 of the present disclosure, even when the phase shift images are selectively binned, the quality of the final 3D image may not be affected. This will be described in detail with reference to FIGS. 6A, 6B, and 7.

Figure 5:
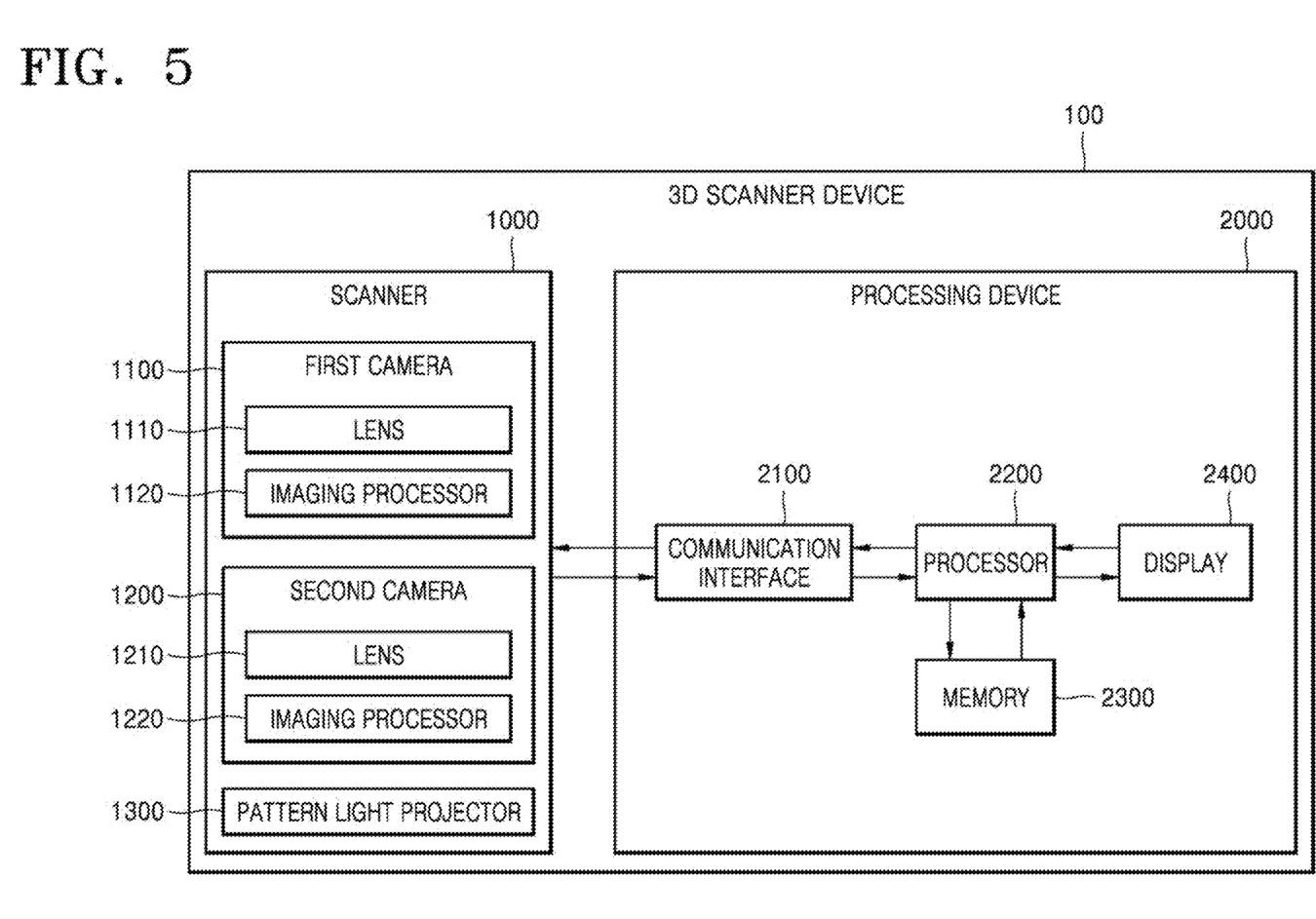
FIG. 5 is a block diagram illustrating elements of a 3D scanner device, according to an embodiment of the present disclosure.

FIG. 5 is a block diagram illustrating elements of a 3D scanner device 100, according to an embodiment of the present disclosure.

Referring to FIG. 5, the 3D scanner device 100 may include a 3D scanner 1000 and a processing device 2000. The 3D scanner device 100 may scan an object by using the 3D scanner 1000 to obtain 3D data representing the shape of the object.

The 3D scanner device 100 illustrated in FIG. 5 may perform 3D data obtaining methods according to various embodiments of the present disclosure, and the descriptions of FIGS. 1 to 4 may be applied thereto. Therefore, the same description as provided above is omitted.

The 3D scanner 1000 may obtain raw data of the object by scanning the object. The 3D scanner 1000 may transmit the obtained raw data to the processing device 2000. The 'raw data' may refer to a plurality of two-dimensional image frames obtained by scanning the object.

The 3D scanner 1000 may include a first camera 1100, a second camera 1200, and a pattern light projector 1300.

Although FIG. 5 illustrates that the 3D scanner 1000 includes a total of two cameras including the first camera 1100 and the second camera 1200, but the present disclosure is not limited thereto. In an embodiment, the 3D scanner 1000 may include three or more cameras, or may include only one camera.

The first camera 1100 and the second camera 1200 may obtain a plurality of image data by scanning the object onto which pattern light (or structured light) is projected by the pattern light projector 1300. The image data may be, for example, a plurality of two-dimensional images. The first camera 1100 may include a lens 1110 and an imaging processor 1120. The second camera 1200 may include a lens 1210 and an imaging processor 1220.

The pattern light projector 1300 may project pattern light (or structured light) onto the object. In an embodiment, the pattern light projector 1300 may project a plurality of gray code patterns onto the object in order to distinguish the area of the object into at least one preset area. In an embodiment, the gray code patterns may each be a binary code pattern that divides an area to have a binary index value including 0 and 1.

The first camera 1100 may obtain a plurality of first index images by scanning the object onto which the gray code patterns are projected by using the lens 1110. Similarly, the second camera 1200 may obtain a plurality of second index images by scanning the object onto which the gray code patterns are projected by using the lens 1210.

The pattern light projector 1300 may project a plurality of phase shift patterns having different phase values from each other by shifting a phase on the surface of the object. In an embodiment, the pattern light projector 1300 may project the phase shift patterns onto the object at predetermined time intervals.

The first camera 1100 may obtain a plurality of first phase shift images by scanning the object onto which the phase shift patterns are projected by using the lens 1110. Similarly, the second camera 1200 may obtain a plurality of second phase shift images by scanning the object onto which the phase patterns are projected by using the lens 1210.

The first camera 1100 and the second camera 1200 may bin the obtained first index images and the obtained second index images by using the imaging processors 1120 and 1220, respectively. In an embodiment, the imaging processors 1120 and 1220 may generate a binned index image by calculating an average of pixel values, which are signal values of a plurality of pixels adjacent to each other in an original index image, and replacing the pixel values of the pixels with the calculated average. In another embodiment, the imaging processors 1120 and 1220 may generate a binned index image by sampling one of the pixel values of the pixels adjacent to each other in the original index image and compressing the pixels into one pixel having the sampled pixel value. However, the present disclosure is not limited thereto, and the imaging processors 1120 and 1220 may bin the original index image by using any known binning methods.

In an embodiment, the imaging processor 1120 of the first camera 1100 may generate a plurality of binned first index images by sampling a plurality of pixels included in a plurality of first index images at a preset compression rate. For example, when 2×2 pixels adjacent to each other in horizontal and vertical directions are binned into one pixel, the imaging processor 1120 may obtain a binned index image having only 25% of pixels of an original index image. For example, when binning is performed to compress an original index image having a total of 5 million pixels to 25%, the imaging processor 1120 may obtain a binned index image having about 1.25 million pixels. Similarly, the imaging processor 1220 of the second camera 1200 may generate a plurality of binned second index images by sampling a plurality of pixels included in a plurality of second index images at a preset compression rate. However, the present disclosure is not limited thereto. In an embodiment, the imaging processor 1120 included in the first camera 1100 and the imaging processor 1220 included in the second camera 1200 may maintain the first index images and the second index images in an original state without binning.

The imaging processors 1120 and 1220 may selectively bin the phase shift images. In an embodiment, the imaging processor 1120 included in the first camera 1100 may bin the first phase shift images, and the imaging processor 1220 included in the second camera 1200 may maintain the second phase shift images in an original state without binning. In another embodiment, the imaging processor 1220 may bin the second phase shift images, and the imaging processor 1120 may maintain the first phase shift images in an original state without binning. In another embodiment, the imaging processors 1120 and 1220 may maintain the first phase shift images and the second phase shift images in an original state without binning.

In an embodiment, the imaging processor 1220 included in the second camera 1200 may selectively bin only at least one of the second phase shift images. For example, when a total number of second phase shift images obtained by the second camera 1200 is n, the imaging processor 1220 may select only k phase shift images from the n phase shift images and bin only the selected k phase shift images.

The 3D scanner 1000 may transmit the index images, the first phase shift images, and the second phase shift images to the processing device 2000. For example, when the imaging processor 1220 included in the second camera 1200 bins the second phase shift images, the 3D scanner 1000 may transmit the binned second phase shift images and the phase shift images of the original state to the processing device 2000.

The processing device 2000 may generate 3D data three-dimensionally representing the shape of the surface of the object by using image data received from the 3D scanner 1000. The 'image data' may include the binned index images, the first phase shift images, and the second phase shift images. In an embodiment, the second phase shift images may be images binned at a preset compression rate. The '3D data' may be point cloud data or polygon mesh data.

The processing device 2000 may be any electronic device capable of generating, processing, displaying, and/or transmitting the 3D data or 3D images of the object, based on the received image data. For example, the processing device 2000 may be a computing device, such as a smartphone, a laptop computer, a desktop computer, a PDA, and a tablet PC, but is not limited thereto. The processing device 2000 according to an embodiment may analyze 3D data or 3D images of the object, and may process, display, and/or transmit an analysis result.

The processing device 2000 may include a communication interface 2100, a processor 2200, a memory 2300, and a display 2400.

The communication interface 2100 may be connected to the 3D scanner 1000 and transmit and receive data to and from the 3D scanner 1000. The communication interface 2100 may be electrically and/or physically connected to the 3D scanner 1000 by using one of communication schemes including, for example, a wired LAN, Ethernet, or GigE. However, the present disclosure is not limited thereto, and the communication interface 2100 may be connected to the 3D scanner 1000 by using a USB connection scheme of a USB 2.0 or USB 3.0 standard.

The processor 2200 executes at least one instruction or program code to control the 3D scanner 1000 and the processing device 2000 to perform intended operations and/or functions. In the description of the present disclosure, the operations and/or functions performed by the 3D scanner device 100 may be operations that are controlled by the processor 2200 so as to be performed by the 3D scanner 1000 or the processing device 2000. The at least one instruction or program code may be stored in an internal memory (not illustrated) included in the processor 2200 or the memory 2300 included in the processing device 2000 separately from the processor 2200.

The processor 2200 according to an embodiment may execute the at least one instruction or program code to control at least one component included in the processing device 2000 to perform intended operations and/or functions. In addition, the processor 2200 may include a graphic processing unit (GPU) (not illustrated) for graphic processing corresponding to video. In addition, the processor 2200 may be implemented as a system on chip (SoC) in which a core (not illustrated) and a GPU (not illustrated) are integrated. However, the present disclosure is not limited thereto, and the processor 2200 may be implemented as at least one of central processing units, microprocessors, digital signal processors (DSPs), digital signal processing devices (DSPDs), programmable logic devices (PLDs), and field programmable gate arrays (FPGAs).

In an embodiment, the processor 2200 may generate 3D data of the object by using image data received from the 3D scanner 1000, and may generate a 3D image of the object by rendering the 3D data. In an embodiment, the processor 2200 may obtain 3D data by combining the index images and the phase shift images received from the 3D scanner 1000 and performing a 3D operation, such as optical triangulation, and may generate a 3D image by rendering the 3D data.

In an embodiment, when the processing device 2000 receives the first phase shift images of the original state and the binned second phase shift images from the 3D scanner 1000, the processor 2200 may generate a first phase angle map by combining the first phase shift images and may generate a second phase angle map by combining the binned second phase shift images. The processor 2200 may obtain a first unwrapped phase angle map by combining the first index map generated from the first index images and the first phase angle map. Similarly, the processor 2200 may obtain a second unwrapped phase angle map by combining the second index map generated from the second index images and the second phase angle map. The processor 2200 may perform pixel matching between the first unwrapped phase angle map and the second unwrapped phase angle map by using the epipolar constraint, and may generate a 3D image of the object based on 3D point information obtained by performing optical triangulation.

The memory 2300 may store at least one instruction or program code. In addition, the at least one instruction or program code stored in the memory 2300 may be executed by the processor 2200. In an embodiment, the memory 2300 may store image data received from the 3D scanner 1000 (e.g., raw data, two-dimensional image data, 3D data, etc. obtained through the scanning of the object). The memory 2300 may store a 3D image three-dimensionally representing the object.

The memory 2300 may include, for example, at least one type of storage medium selected from flash memory-type memory, hard disk-type memory, multimedia card micro-type memory, card-type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disc, and optical disc.

The display 2400 may display a certain screen according to the control of the processor 2200. In an embodiment, the display 2400 may display the 3D image of the object generated by the processor 2200. In addition, the display 2400 may display a user interface screen including the 3D image. Alternatively, the display 2400 may display a user interface screen including information related to diagnosis and treatment of the object.

The display 2400 may be implemented as at least one of, for example, a liquid crystal display, a thin-film transistor-liquid crystal display, an organic light-emitting diode, a flexible display, a 3D display, and an electrophoretic display.

Figure 6A:
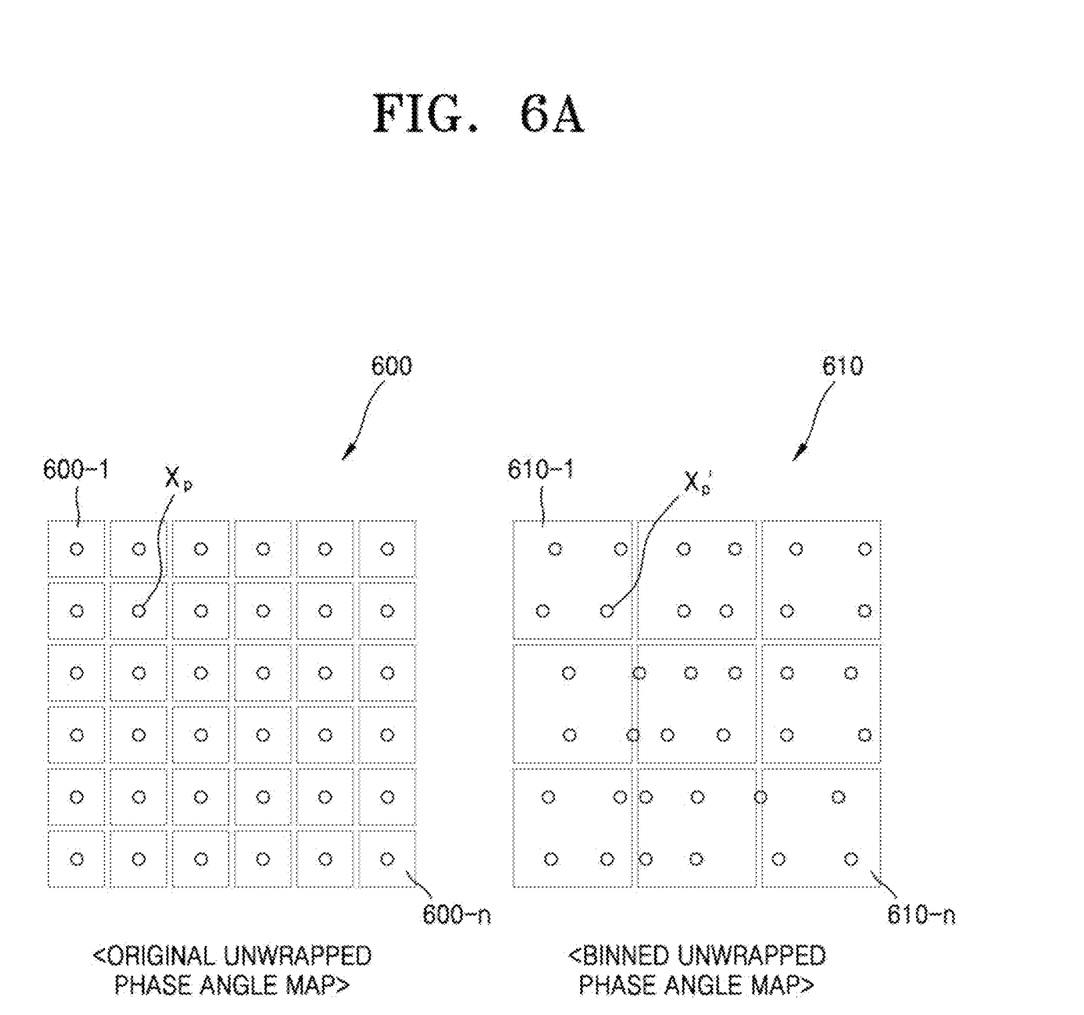
FIGS. 6A and 6B are diagrams for describing a method by which a 3D scanner device performs pixel matching between an original phase shift image and a binned phase shift image, according to an embodiment of the present disclosure.
Figure 6B:
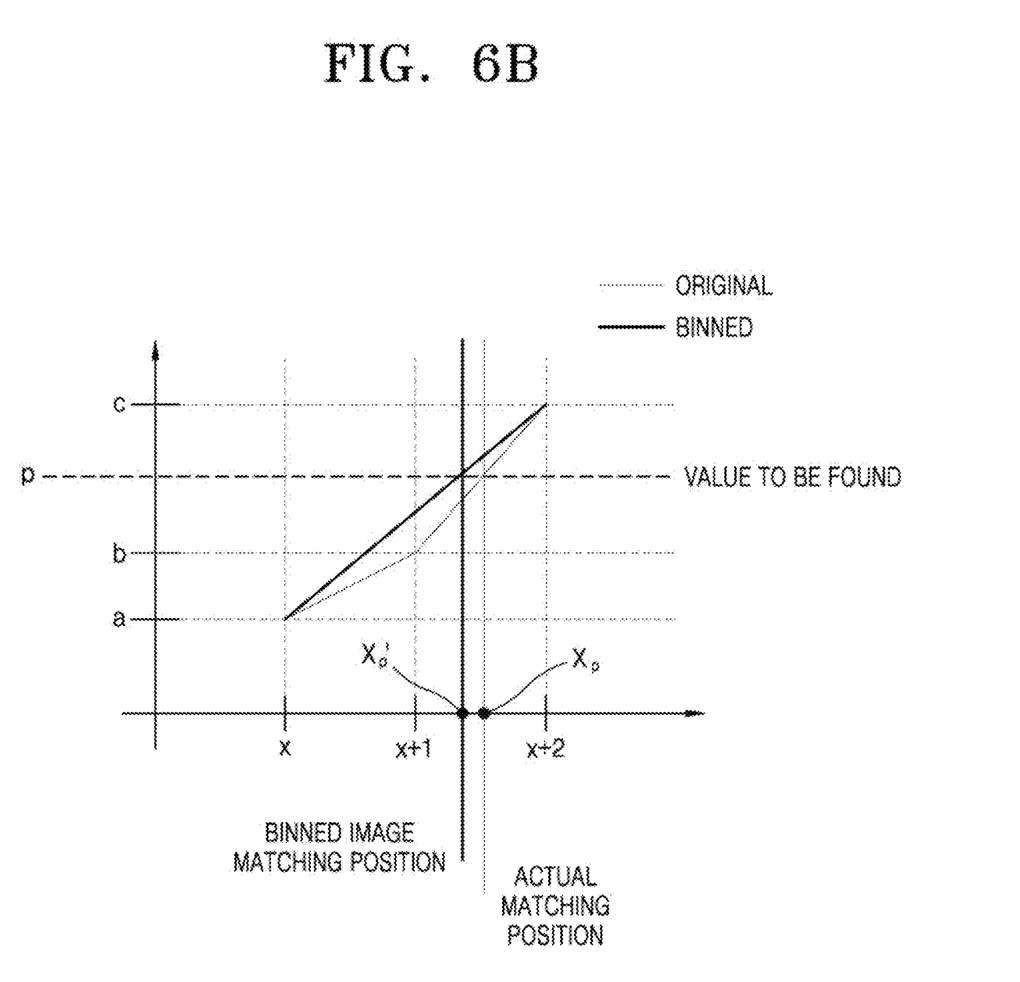

FIGS. 6A and 6B are diagrams for describing a method by which the 3D scanner device 100 performs pixel matching between an original unwrapped phase angle map 600 and a binned unwrapped phase angle map 610, according to an embodiment of the present disclosure.

Referring to FIG. 6A, the original unwrapped phase angle map 600 may be an image that is generated by combining a plurality of phase shift images of an original state and includes a total of 6×6 (=36) pixels 600-1 to 600-n. The binned unwrapped phase angle map 610 may be an image that is generated by combining a plurality of binned phase shift images and is generated by binning an original image by ½, that is, at a compression rate of 25%. The binned unwrapped phase angle map 610 may include a total of 3×3 (=9) pixels 610-1 to 610-n.

The processor (see 2200 of FIG. 5) may identify, from the binned unwrapped phase angle map 610, a point corresponding to an arbitrary point Xp included in the original unwrapped phase angle map 600. In an embodiment, the processor 2200 may obtain pixel value information of the point Xp included in the original unwrapped phase angle map 600 and may identify, from the binned unwrapped phase angle map 610, a point Xp' having a pixel value matching a pixel value of the obtained Xp.

The binned unwrapped phase angle map 610 includes only pixels corresponding to 25% of the original image. Therefore, the point Xp' having a pixel value matching a pixel value of the point Xp may not be completely identical to the position of the point Xp of the original unwrapped phase angle map 600. In this regard, FIG. 6B shows a graph in which the x-axis represents the position coordinates of the point and the y-axis represents the pixel value of the point. Referring to FIG. 6B together, the pixel value p of the point Xp may be a value between b and c. For example, when a value of b is 1.8, a value of c is 3.6, and a value of p is 3, the position coordinates of the point Xp in the original unwrapped phase angle map 600 may be (1.66, 0).

The processor 2200 may identify a point having a pixel value interpolated by adjacent pixels in the binned unwrapped phase angle map 610. Referring to FIGS. 6A and 6B together, because the binned unwrapped phase angle map 610 does not have a pixel value of b, the processor 2200 may identify the point Xp' of the point where an imaginary line connecting a to c meets p. For example, when a value of a is 1.2, a value of b is 1.8, a value of c is 3.6, and a value of p is 3, the processor 2200 may identify (1.5, 0), which is the position coordinates of the point Xp', from the binned unwrapped phase angle map 610.

In FIG. 6B, when the pixel point having a pixel value p of 3 in a reference unwrapped phase angle map obtained by using a first camera, which is a reference camera among a plurality of cameras, is identified from the original unwrapped phase angle map obtained by using the remaining cameras (e.g., a second camera), the coordinate value of the pixel point is (1.66, 0), and when the pixel point is identified in the binned unwrapped phase angle map 610, the coordinate value of the pixel point is (1.5, 0). The coordinate values of the pixel points are (1.66, 0) and (1.5, 0) for the original case and the binned case, respectively. Accordingly, there is no remarkable difference therebetween. Therefore, there is no remarkable difference between 3D data obtained by performing optical triangulation based on the reference unwrapped phase angle map of the original state and the unwrapped phase angle map 600 and 3D data obtained by performing optical triangulation operation based on the reference unwrapped phase angle map of the original state and the binned unwrapped phase angle map 610.

In the embodiment illustrated in FIGS. 6A and 6B, the processor 2200 may perform pixel matching between the original unwrapped phase angle map and the binned unwrapped phase angle map 610. In this case, pixel values included in the binned unwrapped phase angle map 610 are interpolated by using adjacent pixel values, and pixel matching with the original image is performed by using the interpolated pixel values. Accordingly, even when one image is binned, the quality of the synthesized image may not be degraded. That is, even when the phase shift image obtained by using the reference camera, that is, the first camera, among the phase shift images obtained through the cameras is the original, and the phase shift image acquired through the remaining cameras is the binned image, the resolution and quality of the synthesized unwrapped phase angle map are not affected or are insignificantly affected. The 3D scanner device 100 according to the embodiment illustrated in FIGS. 6A and 6B has an effect of significantly reducing the transmission time of image data without degradation of image quality through binning.

Figure 7:
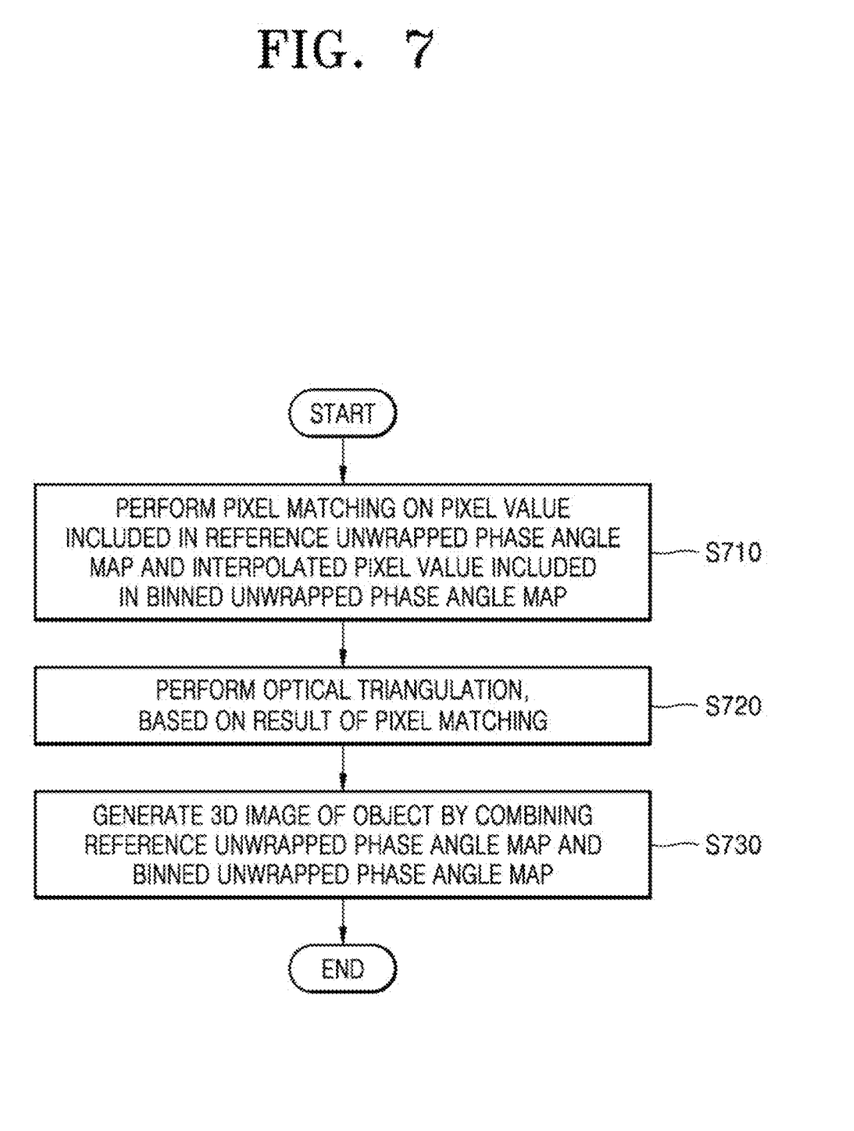
FIG. 7 is a flowchart of a method by which a 3D scanner device performs pixel matching between an original phase shift image and a binned phase shift image, according to an embodiment of the present disclosure.

FIG. 7 is a flowchart of a method by which the 3D scanner device 100 performs pixel matching between an original phase shift image and a binned phase shift image, according to an embodiment of the present disclosure. Specifically, the respective operations illustrated in FIG. 7 may be performed by the processor (see 2200 of FIG. 5) of the processing device (see 2000 of FIG. 5).

In operation S710, the 3D scanner device 100 performs pixel matching on a pixel value included in the reference unwrapped phase angle map and an interpolated pixel value included in the binned unwrapped phase angle map. In an embodiment, the processor 2200 may identify, from the binned unwrapped phase angle map, a pixel matching one of a plurality of pixels included in the original reference unwrapped phase angle map. In an embodiment, the processor 2200 may perform pixel matching by using the interpolated pixel value among the pixel values included in the binned unwrapped phase angle map.

In operation S720, the 3D scanner device 100 performs optical triangulation, based on a result of the pixel matching. In an embodiment, the processor 2200 may perform an optical triangulation operation by using position coordinates of a pixel point identified from the binned unwrapped phase angle map.

In operation S730, the 3D scanner device 100 generates a 3D image of an object by combining the reference unwrapped phase angle map and the binned unwrapped phase angle map.

An operating method of the 3D scanner device 100, according to an embodiment of the present disclosure, may be implemented in the form of program instructions that are executable through a variety of computer means and may be recorded on a computer-readable medium. In addition, according to an embodiment of the present disclosure, a computer-readable storage medium having recorded thereon one or more programs including one or more instructions for executing the operating method of the 3D scanner device 100 may be provided.

The computer-readable storage medium may include program instructions, data files, data structures, etc. alone or in combination. Examples of the computer-readable storage medium may include hardware devices configured to store and execute program code, such as magnetic media (e.g., hard disk, floppy disk, and magnetic tape), optical media (e.g., compact disc read-only memory (CD-ROM) and digital versatile disc (DVD)), magneto-optical media (e.g., floptical disk), read-only memory (ROM), random access memory (RAM), and flash memory.

A machine-readable storage medium may be provided in the form of a non-transitory storage medium. The 'non-transitory storage medium' may refer to a tangible device. For example, the 'non-transitory storage medium' may include a buffer in which data is temporarily stored.

According to an embodiment, the operating method of the 3D scanner device 100, according to various embodiments of the present disclosure, may be provided by being included in a computer program product. The computer program product may be distributed in the form of a machine-readable storage medium (e.g., CD-ROM). In another embodiment, the operating method of the 3D scanner device 100 may be distributed (e.g., downloaded or uploaded) to a user device (e.g., a smartphone) directly or online via an application store (e.g., Play Store™).

Although the embodiments have been described in detail, the scope of the present disclosure is not limited thereto, and various modifications and improvements made using the basic concept of the present disclosure defined in the appended claims by those of ordinary skill in the art also fall within the scope of the present disclosure.

The invention claimed is:

1. A method performed by a three-dimensional (3D) scanner, the method comprising:
    obtaining a plurality of index images by scanning, by using a plurality of cameras, an object onto which gray code patterns for setting an area index for distinguishing each area of the object are projected;
    selecting at least one index image obtained through a camera from among the plurality of cameras from among the plurality of index images;
    binning the at least one index image by sampling a plurality of pixels included in the at least one index image into one pixel based on a predetermined compression ratio; and
    transmitting the binned at least one index image to a processing device connected to the 3D scanner.

2. The method of claim 1, wherein the plurality of index images comprise a plurality of first index images obtained by using a first camera and a plurality of second index images obtained by using a second camera.

3. The method of claim 1, further comprising:
    projecting a plurality of phase shift patterns having different phase values onto a surface of the object by using a pattern light projector; and
    obtaining a plurality of phase shift images by scanning the surface of the object by using the plurality of cameras.

4. The method of claim 3, wherein the plurality of phase shift images comprise a plurality of first phase shift images obtained by using a first camera and a plurality of second phase shift images obtained by using a second camera, and
    the method further comprises binning a plurality of phase shift images obtained by using at least one camera selected from the first camera and the second camera among the plurality of first phase shift images and the plurality of second phase shift images.

5. The method of claim 4, wherein the binning of the plurality of phase shift images comprises binning at least one phase shift image selected from the plurality of phase shift images obtained by using the selected at least one camera.

6. A three-dimensional (3D) scanner device for obtaining a 3D image of an object, the 3D scanner device comprising:
    a scanner configured to:
        obtain a plurality of index images by scanning, by using a plurality of cameras, the object onto which gray code patterns for setting an area index for distinguishing each area of the object are projected, and obtain a plurality of phase shift images by scanning a surface of the object onto which a plurality of phase shift patterns having different phase values is projected,
        select at least one index image obtained through a camera selected from among the plurality of cameras from among the plurality of index images, and
        bin the at least one index image by sampling a plurality of pixels included in the at least one index image into one pixel based on a predetermined compression ratio;
    a communication interface configured to receive, from the scanner, the binned at least one index image and the plurality of phase shift images; and
    a processor configured to generate a 3D image of the object through image processing of combining the at least one index image and the plurality of received phase shift images.

7. The 3D scanner device of claim 6, wherein the plurality of index images comprise a plurality of first index images obtained by using a first camera and a plurality of second index images obtained by using a second camera.

8. The 3D scanner device of claim 6, wherein the scanner comprises:
    a pattern light projector configured to project the plurality of phase shift patterns onto the surface of the object, and
    wherein the scanner is further configured to:
        obtain a plurality of first phase shift images by scanning the surface of the object using a first camera and obtain a plurality of second phase shift images by scanning the surface of the object by using a second camera; and bin a plurality of phase shift images obtained by using at least one camera selected from the first camera and the second camera among the plurality of first phase shift images and the plurality of second phase shift images.

9. The 3D scanner device of claim 8, wherein the scanner is further configured to bin at least one phase shift image selected from the plurality of phase shift images obtained by using the selected at least one camera.

10. A non-transitory computer-readable recording medium having recorded thereon a program including at least one instruction for causing a computer to perform a method of processing an image obtained by a three-dimensional (3D) scanner, the method comprising:

obtaining a plurality of index images by scanning, by using a plurality of cameras, an object onto which gray code patterns for setting an area index for distinguishing each area of the object are projected;

selecting at least one index image obtained through a camera from among the plurality of cameras among the plurality of index images;

binning the at least one index image by sampling a plurality of pixels included in the at least one index image into one pixel based on a predetermined compression ratio; and transmitting the binned at least one index image to a processing device connected to the 3D scanner.

\* \* \* \* \*